Aug. 8, 1967  G. W. SEULEN ETAL  3,335,212
INDUCTION MELTING FURNACE
Filed Aug. 27, 1964  5 Sheets-Sheet 3

INVENTORS.
JOHN T. VAUGHAN &
GERHARD W. SEULEN
BY
Tillery & Body
ATTORNEYS

INVENTORS.
JOHN T. VAUGHAN &
GERHARD W. SEULEN
BY
Tillowry & Body
ATTORNEYS

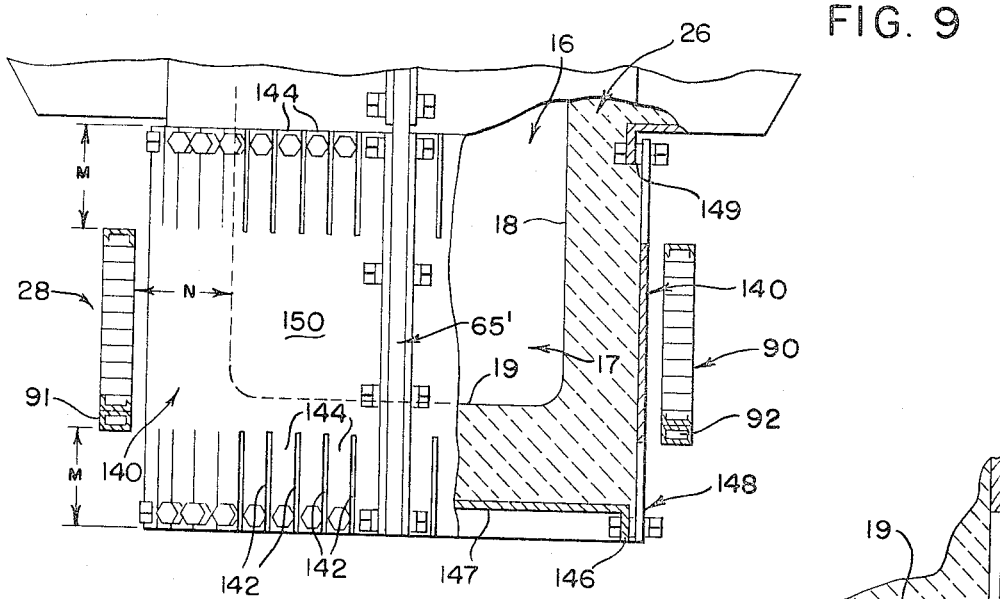
FIG. 9
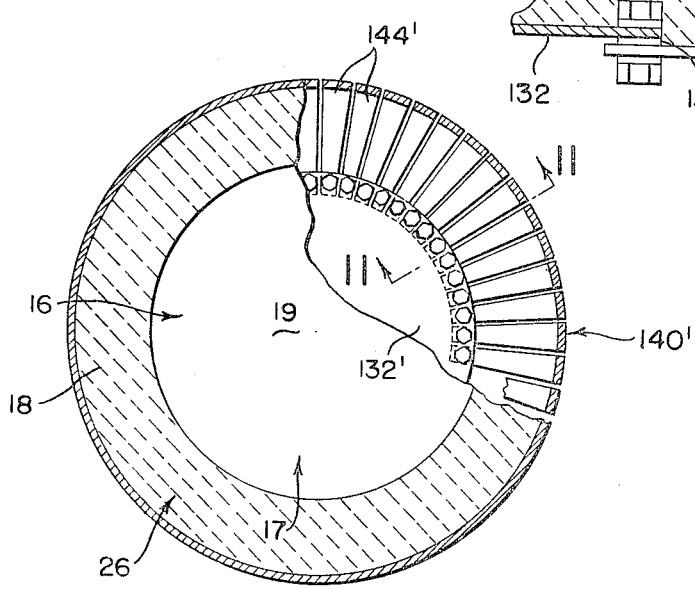
FIG. 11
FIG. 10
INVENTORS.
JOHN T. VAUGHAN &
GERHARD W. SEULEN
ATTORNEYS

United States Patent Office 3,335,212
Patented Aug. 8, 1967

3,335,212
INDUCTION MELTING FURNACE
Gerhard W. Seulen, Remscheid-Hasten, Germany, and John T. Vaughan, Tampa, Fla., assignors, by mesne assignments, to Alco Standard Corporation, formerly known as Alco Chemical Corporation, Philadelphia, Pa., a corporation of Ohio
Filed Aug. 27, 1964, Ser. No. 392,526
11 Claims. (Cl. 13—27)

This invention relates generally to the art of induction heating and more particularly to an inductively heated ladle or container for molten metals.

It is common practice in inductively heated ladles or the like of capacities of a ton or more to imbed the induction coil in a refractory lining which in turn is supported inside of a steel outer shell.

This construction has certain disadvantages arising primarily from the imbedded location of the induction coil. Such coils are usually constructed of copper tubing and must be water cooled to prevent them from melting. The water cooled coil tends to cool the refractory lining thus taking heat away from the molten metal charge. Furthermore, when the apparatus is poured or tapped, the refractory lining is rapidly cooled by the coil leading to thermal shock. Also, thermal shock results when molten metal is poured into an empty unit after the refractory lining has been cooled by the continuously circulating water in the induction coil. Aside from these disadvantages, there is a risk of an explosion if the molten metal penetrates a crack in the lining and melts a portion of the coil thus coming into contact with the cooling water. Another factor is the difficulty of repairing the refractory lining. In relining, pneumatic hammers or the like are used to chip out worn or defective refractory and extreme care must be used to avoid possible damage to the coil.

Ideally the induction coil should be mounted on the outside of the steel shell to avoid these problems, but with this solution new difficulties arise. Thus, the steel shell or casing of the apparatus is directly within the strongest part of the magnetic field about the coil and will absorb appreciable amounts of electric energy greatly impairing the heating efficiency. Since refractory materials have a very low tensile strength, it would not be practical to simply eliminate the casing because some support is necessary to reinforce the refractory lining.

The present invention contemplates an inductively heated ladle which overcomes all of the above-referred to difficulties and others and provides an inductively heated ladle which is relatively simple in construction, electrically efficient and has a wide variety of applications.

In accordance with a principal aspect of the invention, an inductively heated ladle is provided including a container having side and bottom walls formed of a refractory material defining an interior chamber for holding a molten metal charge, a multi-turn induction coil surrounding the container and adapted to be connected to an alternating current power source of known frequency and create a varying magnetic field linking with the metal charge within the chamber and a nonmagnetic metal enclosure member embracing the refractory side walls in a continuously encircling manner and in physically supporting relationship thereto inside of the coil. This enclosure member is dimensioned relative to the "reference depth" of the magnetic field at the frequency of the power source so as not to absorb an amount of electrical power which will be seriously detrimental to the operation of the apparatus, and includes an electrically insulating barrier extending generally parallel to the coil axis so that it is electrically discontinuous.

By "reference depth" is meant the depth of penetration of a magnetic field in a metallic member, which depth may be defined by the equation: $d = 3160\sqrt{r/f}$ where $d$ is in inches, $r$ is the resistivity of the metal in ohm-inches, and $f$ is the frequency in cycles per second. As is apparent, the higher the resistivity the greater the depth.

Normally, the enclosure member would be made of a nonmagnetic, stainless steel which has a relatively high resistivity compared to the low carbon or magnetic steels and at 60 cycles per second, the reference depth is approximately 2.2 inches.

Further, in accordance with the invention, the enclosure member extends axially below the lower end of the coil and is rigidly joined to a nonmagnetic member positioned below the lower axial end of the coil in physically supporting relationship with the container bottom wall.

In one aspect of the invention, such nonmagnetic member comprises a plurality of circumferentially spaced, radially extending elements in physically supporting relationship with the refractory bottom wall being rigidly connected between the enclosure member and a centrally located nonmagnetic plate, the elements being formed of a material of known resistivity and having a cross-sectional dimension generally parallel to the coil axis which is less than the reference depth.

Further, in accordance with the invention, and particularly in the event the enclosure member is fastened to a metal plate below the lower axial end of the coil, such plate is made of a nonmagnetic, low resistivity metal and high magnetically permeable material is positioned on the upper side of the plate extending preferably from a point radially outside of the coil to a point inwardly beyond the outer diameter of the container but spaced from the axis of the coil whereby to provide a low impedance path for the flux inwardly to the charge. Also an electrically discontinuous, nonmagnetic, metal ring of low resistivity is placed below the lower axial end of the coil and above the plate to partially shield the plate from the flux around the coil, such ring having an axial thickness at least equal to the reference depth.

In an alternative aspect of the invention where the enclosure member is fastened to a metal plate below the lower axial end of the coil, the plate is positioned below the lower end of the coil by a distance equal to at least twice the radial distance between the coil and the metal charge in the container.

In accordance with a further aspect of the invention, and particularly where the enclosure member extends axially above and/or below the upper and lower ends of the coil, it includes a plurality of circumferentially spaced slits defining nonconductive air gaps extending generally parallel to the coil axis from a point adjacent one end of the coil to a substantial distance in an axial direction away from the coil and the circumferential spacing between each slit is not greater than the reference depth.

Where the enclosure member extends above or below the coil by a distance at least equal to the radial distance between the coil and metal charge, the slits extend in an axial direction at least equal to such radial distance.

Furthermore, where the slits extend both above and below the coil, a nonmagnetic ring member is secured at the upper axial end of the enclosure member and a nonmagnetic bottom member is provided at the lower end thereof in physically supporting relationship with the container bottom wall, both members being electrically insulated from the enclosure member.

As an alternative construction where a bottom member is provided, the portions of the enclosure member between the slits are tapered and turned radially inwardly in supporting engagement with the refractory and are connected and insulated at their inner ends to a central disc member to provide such bottom member.

In some instances, the container will extend axially upwardly above the upper end of the coil and will be surrounded by a conventional steel housing and in such event, in accordance with the invention, the enclosure member also extends axially above the upper end of the coil and the steel housing will include an electrically insulating barrier which extends generally parallel to the coil axis so that it is electrically discontinuous for a substantial vertical height above the upper axial end of the coil. In addition, electrically discontinuous, nonmagnetic metal rings having a low resistivity are positioned above the upper axial end of the coil and below the steel housing to shield the housing from the flux around the coil, such rings having an axial thickness of at least equal to the reference depth.

The principal object of the invention is the provision of a new and improved inductively heated ladle for molten metals wherein the inductor coil may be located physically outside of the refractory portion of the ladle and the ladle is strong enough to hold large weights of molten metal.

Another object of the invention is the provision of a new and improved refractory container for molten metals in which the inductor is located externally of the refractory portion, and reinforcing means are provided for the refractory portion so arranged as to absorb a minimum or low amounts of the electrical power.

Another object of the invention is the provision of a new and improved inductively heated ladle for holding molten metal wherein the inductor coil is located externally of the refractory portion of the ladle, metallic reinforcing means are provided for the refractory portion including a metallic base plate and magnetically permeable means are provided for carrying the magnetic flux to the molten charge and preventing it from linking with the metal base plate.

Another object of the invention is the provision of a new and improved ladle for holding molten metal comprised of upper and lower refractory portions and having an induction heating coil surrounding the lower portion, the upper portion being surrounded by a steel case and being so arranged as to absorb a minimum amount of electrical energy from the flux field around the coil.

A further object is the provision of means for shielding the upper metallic case and lower metal base plate from the magnetic flux of the induction heating coil.

These and other objects will become apparent through a better understanding of the invention which may be gained by reference to the following description and drawings wherein:

FIGURE 9 is a fragmentary side-elevational view of the lower portion of the ladle showing another modification of the invention;

FIGURE 10 is a horizontal cross-sectional view taken above the bottom of the ladle with portions of the refractory broken away showing still another modification of the invention; and FIGURE 11 is a sectional view taken along line 11—11 of FIGURE 10.

Figure 1:
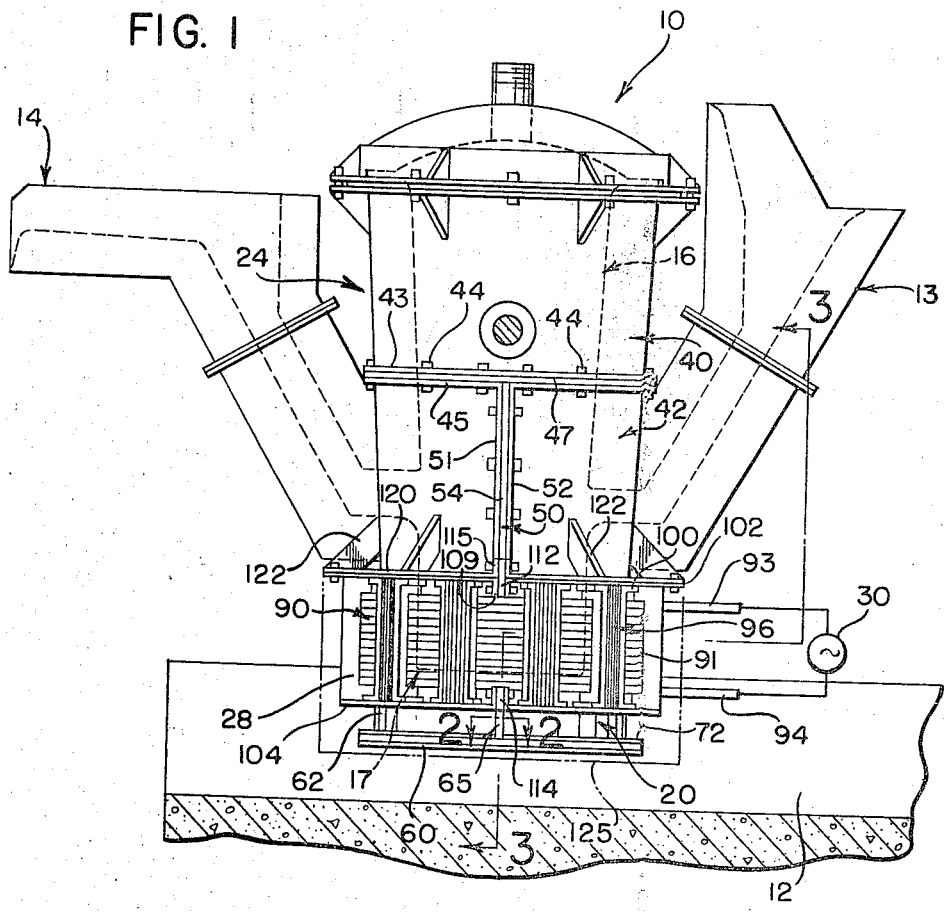
FIGURE 1 is a side elevation view of an inductively heated pouring ladle incorporating the invention.

The invention will be described with particular reference to a pouring ladle, although it is not necessarily so limited. Furthermore, the description herein will be confined to a power source having a frequency of 60 cycles per second, but it should be understood that other frequencies consistent with efficient induction melting will serve equally as well inasmuch as the particular operating frequency is not a limitation of the invention.

Referring generally to the drawings wherein the showings are for the purpose of illustrating preferred embodiments of the invention only and not for the purpose of limiting same, the figures show a pouring ladle 10 supported from a bail and trunnion mechanism 11 over a pit 12 and having a filling spout 13 and a pouring spout 14 on opposite sides of the ladle 10 and opening into a main chamber 16 having a lower sump portion 17 which is defined by refractory side and bottom walls 18 and 19. A shell 20 supports the refractory walls 18, 19 enabling them to withstand the weight of a molten metal charge 22 while a conventional metal casing 24 reinforces the upper refractory lining 26 of the ladle 10. For a more detailed understanding of pouring ladles of the type shown and their operation, reference is made to U.S. Patent 3,058,180, entitled "Apparatus for Pouring Molten Metal," issued October 16, 1962.

An induction heating coil assembly 28 is mounted in exterior surrounding relationship with respect to the refractory wall 18 and shell 20 and is adapted to be connected to an alternating current power source, generally indicated by the numeral 30, for inductively heating the metal charge 22 situated in the sump 17.

*Casing*

Figure 3:
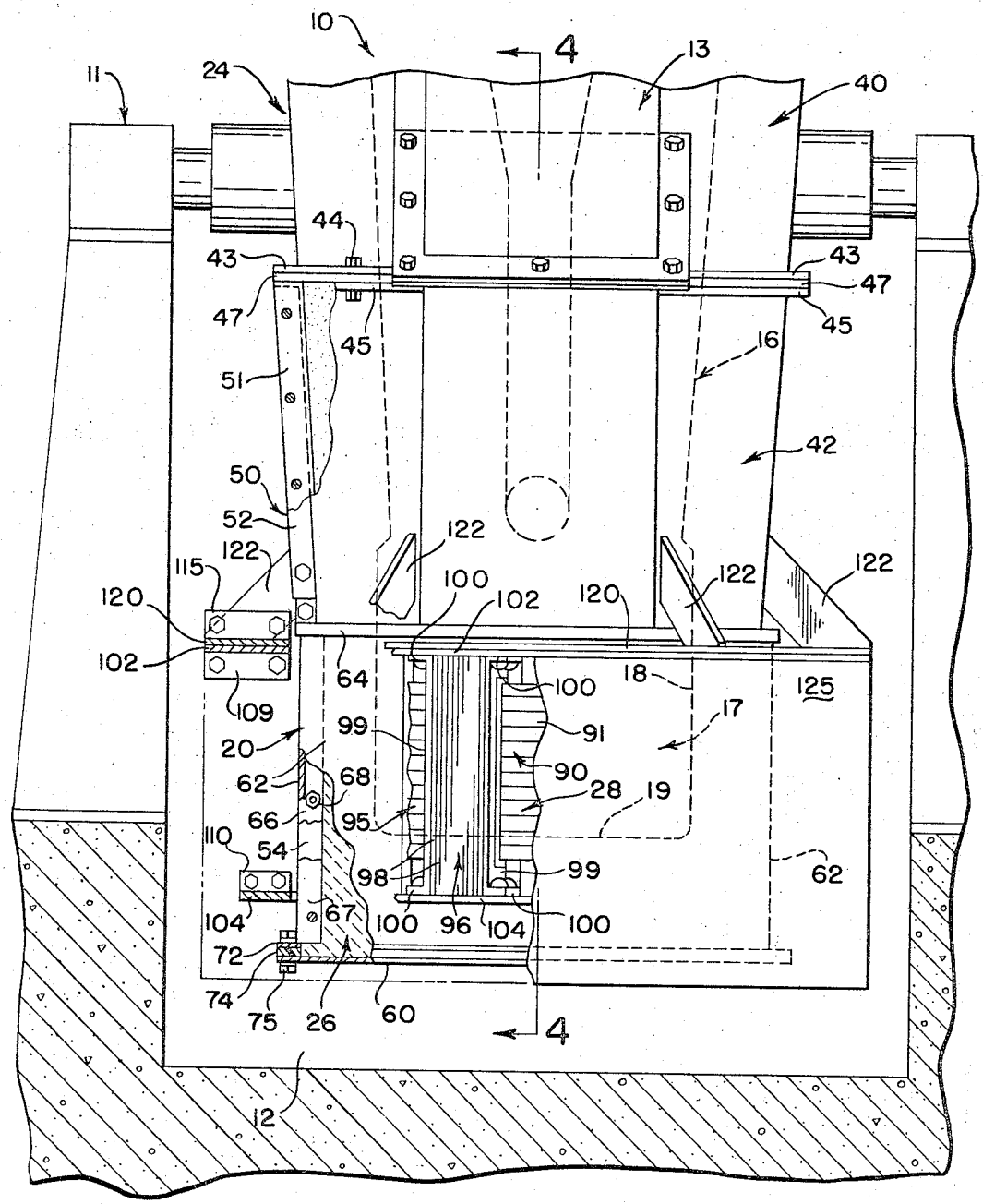
FIGURE 3 is a right side partial elevation view taken approximately along line 3—3 of FIGURE 1 with portions of the ladle casing, coil and coil housing broken away to show feature of the invention.
Figure 4:
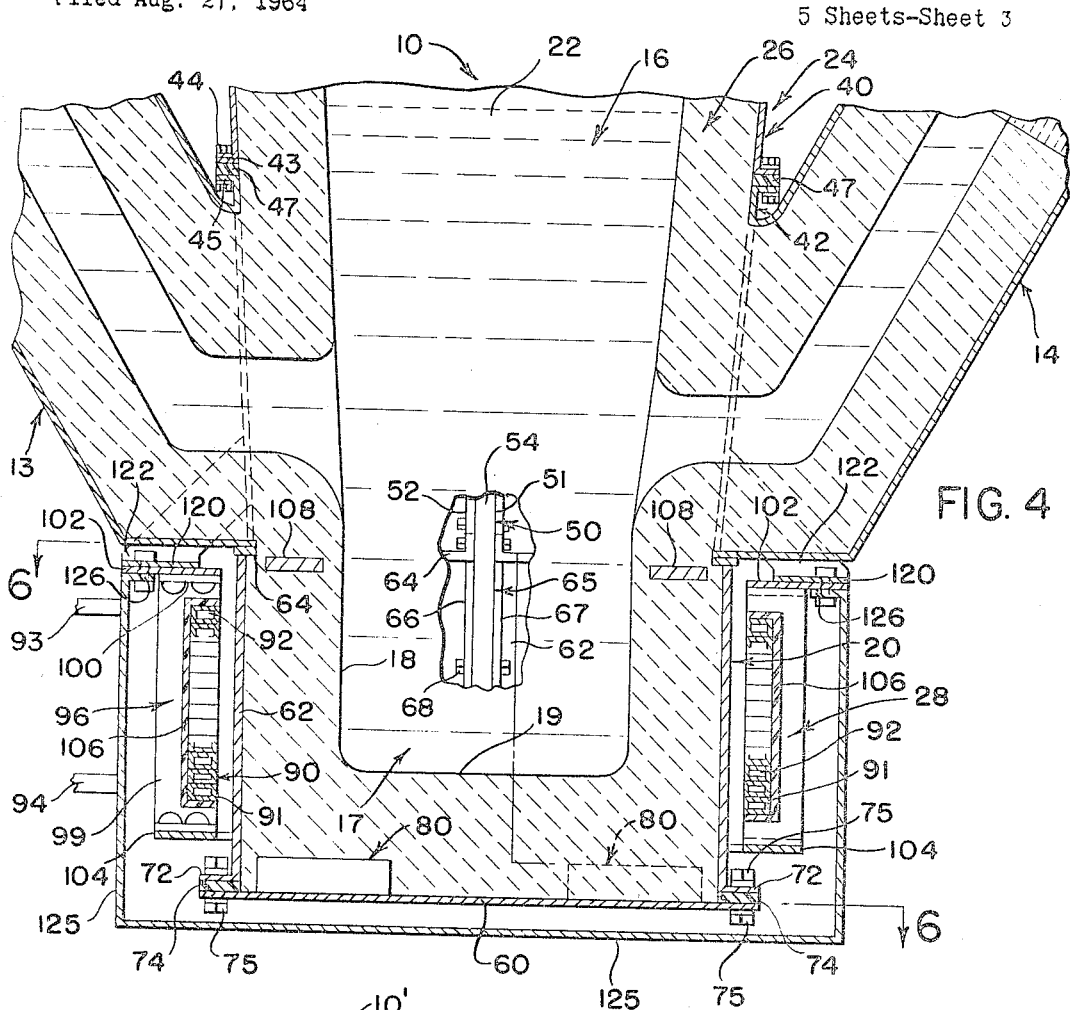
FIGURE 4 is a partial vertical cross-sectional view of the ladle taken along line 4—4 of FIGURE 3 with portions of the sump refractory broken away showing a feature of the invention.

With particular reference to FIGURES 1, 3, and 4, the metal casing 24 is normally made of steel plate and has formed around the inside thereof the refractory lining 26 which may be firebrick or a suitable alumina base refractory mix. The casing 24 supports this portion of the lining against the laterally acting fluid pressures of the melt and extends downwardly below the spouts 13 and 14 terminating in a plane slightly above the top of the induction coil assembly 28. The casing 24 is actually in two parts, an upper section 40 and a lower section 42. The upper section 40 has a lower annular flange 43 which is attached by bolts 44 to a mating upper annular flange 45 on the lower section 42. Secured between the flanges 43 and 45 is a ring 47 of a suitable insulation material forming an electrically insulative circumferential seam between the upper and lower sections 40 and 42. Bolts 44 are suitably insulated from the flanges to insure that no conductive path is provided between the two sections 40 and 42. In addition, the lower section 42 has an axially extending split 50 generally parallel to the axis of the induction coil assembly 28 defined by two parallel flanges 51 and 52. A strip 54 of an insulation material is located between the flanges 51 and 52 which are bolted together in electrically insulative fashion whereby the lower section 42 is rendered electrically nonconductive in a circumferential direction as well as being electrically isolated from the upper section 40 for reasons to be explained more fully hereinafter.

Shell

Due to the hydrostatic pressure of the molten metal charge 22 and the low tensile strength of presently available refractory materials, it is necessary to reinforce the refractory walls 18, 19 of the sump 17.

Figure 2:
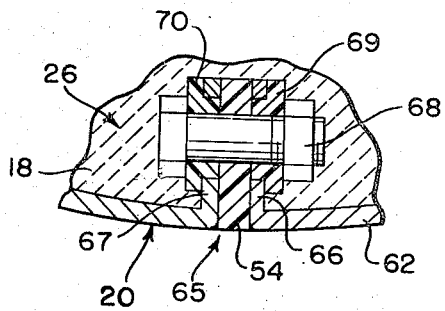
FIGURE 2 is an enlarged fragmentary sectional view taken along line 2—2 of FIGURE 1.

To provide such reinforcement, and in accordance with the invention, the shell 20 is positioned below the casing 24 in supporting engagement with the refractory material. Referring to FIGURES 1–4, the shell 20 includes a bottom disc 60 rigidly connected to an encircling wall 62 having an upper mounting ring 64 which may be welded or otherwise secured to the bottom edge of the casing section 42. The wall 62 surrounds the refractory lining walls 18 in physically supporting relationship radially inwardly of the coil assembly 28 and has a split 65 in its circumference defined by flanges 66 and 67 extending generally parallel to the coil axis. The split 65 is aligned with the split 50 in the casing section 42 and the insulation strip 54 in the section 42 is merely extended axially downwardly and secured between the parallel flanges 66 and 67 by bolts 68 insulated from the flanges 66 and 67 by a pair of grommets 69 and 70 made of a suitable electrically insulating material, as best shown in FIGURE 2. Thus, both the casing section 42 and the wall 62 are rendered electrically discontinuous in a circumferential direction.

For reasons to be explained, an important feature of the invention is that the wall 62 has a predetermined radial thickness in addition to being electrically discontinuous, both being factors in reducing power losses and increasing electrical efficiency. In this connection, the wall 62 and upper ring 64 are preferably formed of high strength, nonmagnetic metal having a relatively high electrical resistivity, e.g., stainless steel which exhibits a predominately stable austenitic phase at room temperature.

The bottom disc 60 is insulated from the wall 62 by an insulation ring 74 and is secured about its circumference to a radial flange 72 on the lower end of wall 62 by means of bolts 75 insulated in a manner similar to the showing in FIGURE 2 so that the disc 60 is isolated electrically from the wall 62. Since the disc 60 is close enough to the coil assembly 28 to be within a portion of the magnetic field, it is preferably formed of a nonmagnetic metal having a low electrical resistivity such as brass or copper. Of course, other metals may also be used, for example, alloys of aluminum.

Figure 6:
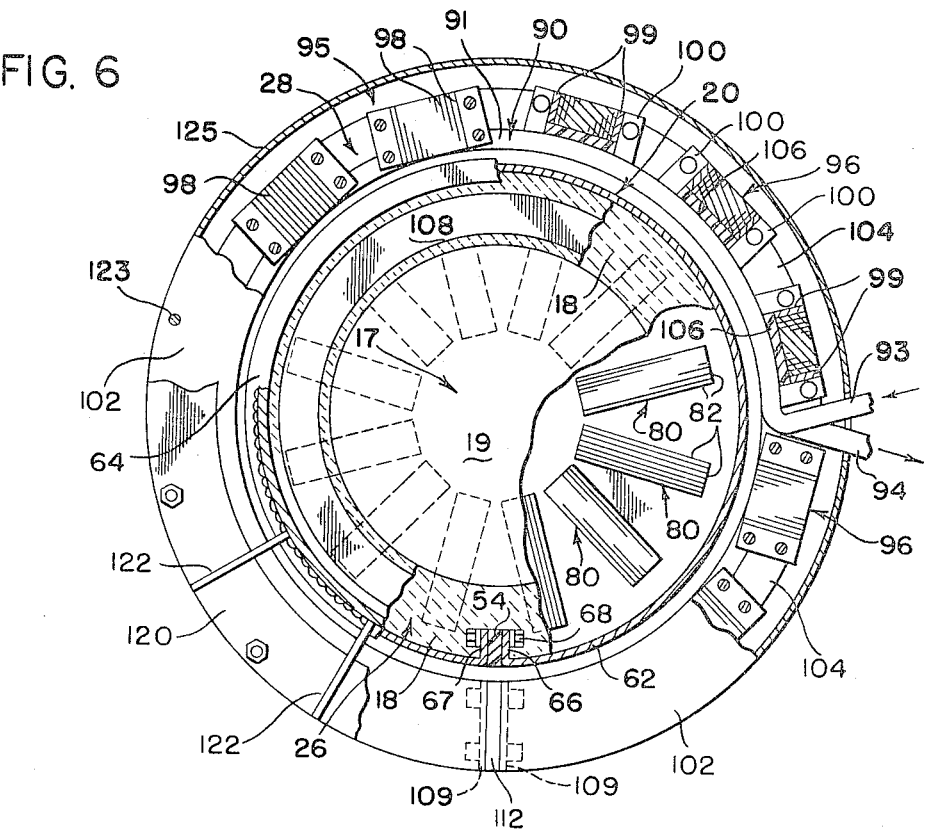
FIGURE 6 is an offset horizontal cross-sectional view of the ladle taken along line 6—6 of FIGURE 4 with portion broken away to show details of the invention.

Also due to the proximity of the coil, a plurality of circumferentially arranged packets 80 of high magnetically permeable material are imbedded in the bottom refractory wall 19 above the disc 60. The packets 80 extend from adjacent the lower end of the coil assembly 28 radially inwardly toward, but spaced from, the center of the ladle and rest on the disc 60 as an integral part of the bottom 19 being rammed in with the refractory lining when it is constructed within the shell 20. Referring to FIGURE 6, each packet 80 comprises a number of thin metal laminations 82 secured together in a suitable manner and insulated from each other by an electrically insulating epoxy material. The laminations 82 are made of a high magnetically permeable metal such as silicon steel of the type commonly used for transformer cores. The function of the packets 80 will be discussed in detail hereinafter.

Coil

Referring again to FIGURES 1–4, and 6, the coil assembly 28 includes an induction coil unit 90 in closely spaced circumferential relationship with the shell 20 being formed of a number of turns of copper tubing 91 insulated with an epoxy coating insulation. A plurality of coil circuits may be provided each with its own water cooling passage but for purposes of illustration, a continuous multi-turn coil unit 90 having a single cooling circuit 92 is shown. Cooling water may be supplied and returned through suitable coil terminals and jumper cables 93 and 94 which may be adapted to carry the circulating water as well as the alternating current from the power source 30. Surrounding the coil unit 90 is a coil support structure or yoke 95 including a plurality of circumferentially spaced packs 96 of highly magnetically permeable material extending behind and over each end of the coil unit 90 and preferably aligned with the packets 80 in the refractory bottom 19. As shown best in FIGURES 3 and 4, the packs 96 are formed of a number of channel shaped, thin metal laminations 98 insulated from each other with an epoxy coating material and stacked together between side plates 99 having bosses 100 at each end for mounting each pack 96 between upper and lower rings 102 and 104. The laminations 98 are preferably made of transformer core steel, the same as the laminations 82 in the packets 80. The side plates 99 may be made of any nonmagnetic, high conductivity metal such as brass to minimize induced power losses in them. An insulation board 106 between each pack 96 and the coil unit 90 maintains the adjacent coil turns 91 and laminations 98 separated and helps support the coil.

Magnetic shielding

As best shown in FIGURE 6, the upper ring 102 is relatively wide and overlays the axial upper end of the coil unit 90 extending horizontally between the coil and the lower casing section 42. The lower ring 104 extends beneath the lower end of the coil unit 90 lying between it and the disc 60. In addition a third ring 108, located radially inwardly and generally in the plane of ring 102, is imbedded in the lining wall 18. The rings 102 and 104 are split at some convenient point on their circumferences and have axially extending bolted flanges 109, 110 separated by insulation strips 112, 114 respectively whereby the rings are made electrically discontinuous in a circumferential direction. While not shown, the ring 108 may also be electrically discontinuous if desired, also the rings 102, 104, 108 may have circumferential water cooling passages if found necessary for cooling purposes. The entire coil assembly 28 is removably supported from a hoop 120 carried by brackets 122 welded to the casing section 42. The upper ring 102 has a dual purpose in this regard since it also serves as a mounting ring for the coil assembly 28 and is provided with openings 123 for receiving suitable mounting bolts for this purpose. The hoop 120 is split at the same point on its circumference as is ring 102 and has bolted flanges 115 which are separated by a portion of the insulation material 112 which extends upwardly from the ring 102 whereby the hoop is also electrically discontinuous. A nonmagnetic housing 125 surrounds the coil assembly 28 and has an upper flange 126 which bolts to the hoop 120.

One feature of the invention is that the rings 102, 104, 108 are made of brass or some other nonmagnetic, high conductivity metal and have a predetermined axial thickness for reasons to be explained hereinafter.

Operation

This invention is principally concerned with mounting the coil 90 on the outside of the refractory walls 18 and reinforcing the exposed refractory walls 18 and 19 to enable them to withstand the weight of the molten charge 22. In line with this purpose the shell 20 is designed with reference to induction heating principles so as not to unduly impair the heating efficiency of the externally mounted coil 90. When power is turned on to the coil 90, an alternating current flows and all of the space inside of the coil is subjected to a rapidly changing magnetic field. This varying magnetic field links the coil 90 and the portion of the metal charge 22 in the sump inducing a voltage near the outer surface of the charge causing current to flow therein which heats the charge. As may be expected, any other metallic body presenting a conductive path for induced currents which is linked by the varying magnetic field will also be heated to some degree thus constituting an objectionable power loss which could otherwise be used for heating the metal charge.

In the present invention, instead of an electrically continuous walled structure, the shell 20 has an electrically insulating seam 65 extending generally parallel to the coil axis whereby it is made electrically nonconductive in a circumferential direction. Without the seam 65, the wall 62 would constitute an inductive load for the coil unless it had such a thin radial thickness that the resistivity was increased to the point of reducing the flow of induced currents. Before that condition begins to manifest itself, however, for presently available materials, the wall 62 would have to be made so thin that it would not provide sufficient reinforcement for the refractory lining to be practical and still allow any appreciable cut in power losses. For example, the wall thickness would have to be less than one thirtieth of the reference depth, as heretofore defined, before the electrical efficiency would approach that of conventional inductively heated apparatus in which a coil is imbedded in a refractory lining. With a nonmagnetic stainless steel at 60 cycles per second having a resistivity of approximately $30 \times 10^{-6}$ ohm-inches at 70 F., the permissible wall thickness is approximately 0.073 inch. In contrast, with the electrically insulating seam 65 in the wall 62 so that it is electrically discontinuous, the wall thickness may be much greater. In accordance with the invention, however, the maximum wall thickness is not greater than the reference depth, for which nonmagnetic stainless steel is approximately 2.2 inches at 60 cycles per second. Of course, at higher frequencies the reference depth will be less and the thickness must be decreased accordingly. Using the novel shell 20, the electrical efficiency approaches very closely the efficiency of conventional furnaces where the coil is imbedded in the refractory lining.

Figure 5:
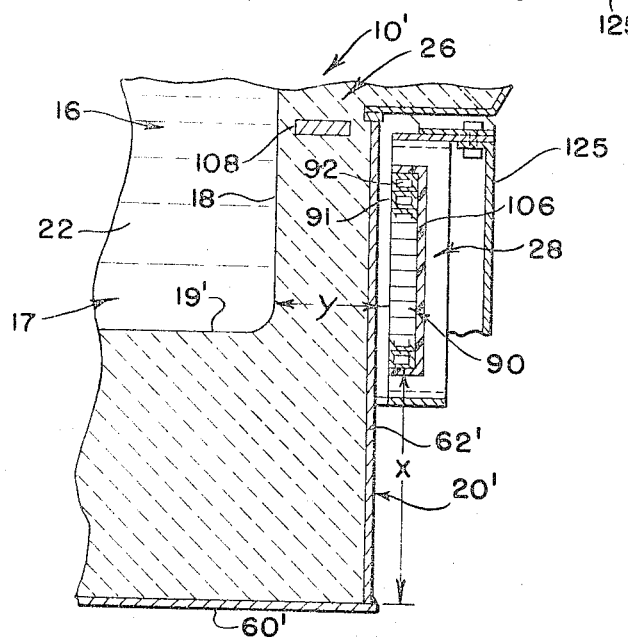
FIGURE 5 is an enlarged fragmentary sectional view of the lower portion of the ladle showing a modification of the invention.

Modifications of the basic shell design are shown in FIGURES 5 and 7–10, and for simplicity, like parts will be identified by like numerals and similar parts will be identified by like numerals with the addition of a prime. In FIGURE 5, a fragmentary view of the lower sump portion of the ladle 10 is shown wherein refractory bottom wall 19′ extends axially below the lower end of the coil 90 by a distance $x$ substantially greater than that shown in FIGURE 4 for example. The wall 62′ of the shell 20′ also extends axially below the lower end of the coil 90 and is rigidly joined to a bottom plate 60′ which may be welded or otherwise secured directly to the lower end of wall 62′ and in physically supporting relationship with the refractory walls 19′. The distance $x$ is at least equal to or greater than twice the radial distance $y$ between the inner diameter of the coil 90 and the outer diameter of the metal charge 22 in the sump 17. In this dropped bottom arrangement, the bottom disc 60′ is substantially beyond the magnetic circuit around the coil 90 and for this reason will not have any appreciable amounts of current induced in it. As a result, magnetically permeable material, such as packets 80, will be unnecessary. Also the disc 60′ may be made of steel if desired instead of a low resistivity metal as was preferably used for the disc 60 of the basic shell 20. While not shown, it is understood that the wall 62′ will have an electrically insulative seam similar to the seam 65 as shown in FIGURE 4 and will be made of a high resistivity, nonmagnetic metal such as stainless steel.

Figure 7:
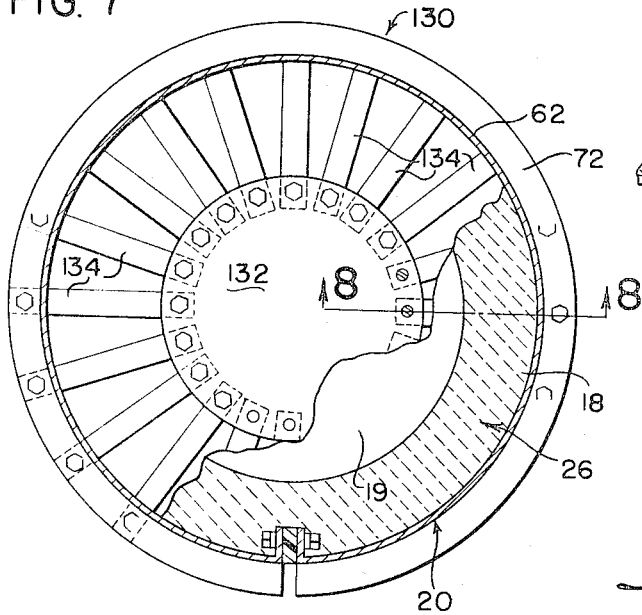
FIGURE 7 is a horizontal cross-sectional view taken above the bottom of the ladle with portions of the refractory broken away showing a further modification of the invention.
Figure 8:
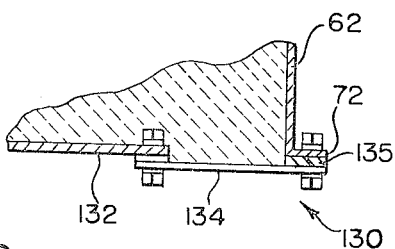
FIGURE 8 is a fragmentary view of the modification of FIGURE 7 taken along lines 8—8.

A further shell modification is shown in FIGURES 7 and 8. In this construction, instead of a low resistivity bottom disc for the shell 20, an open framework bottom member 130 is provided in physically supporting relationship to the refractory bottom wall 19. The member 130 includes a central hub member 132 and a plurality of spoke elements 134 rigidly connected between the periphery of the hub member 132 and the axial lower end of the wall 62. The spoke elements 134 are insulated from the lower flange 72 of the wall 62 by insulative inserts 135. In this modification, induced currents in the bottom of the shell are practically eliminated since the area of metal providing a complete circuit in a circumferential direction has been reduced to the size of the central hub 132. As a result, magnetically permeable material such as packets 80 may be eliminated. The hub member 132 and spoke elements 134 are preferably formed of a nonmagnetic, high resistivity metal such as austenitic stainless steel and in addition, the spoke elements 134 have a thickness generally parallel to the coil axis which is less than the reference depth.

Another modification of the invention is that shown in FIGURE 9. In this arrangement a shell 140 is provided which extends axially above and below the upper and lower ends of the coil 90 by a substantial distance. A plurality of circumferentially spaced slits 142 extend parallel to the coil axis from points adjacent the upper and lower ends of the coil to the top and bottom edges of the shell 140, thus defining air gaps between axially extending portions 144. The slits 142 extend in an axial direction to a distance M which is at least equal to the radial distance N between the inner diameter of the coil 90 and the outer diameter of the metal charge in the ladle sump. The circumferential width of the portions 144 is preferably not greater than the reference depth and the air gap spacing between them is sufficient to provide an electrically insulative barrier between each one. In most applications about one-sixteenth of an inch gap is satisfactory. The lower ends of each portion 144 are insulated from and suitably secured to an axially extending flange 146 of a bottom plate 147 as indicated generally at 148 and the upper ends are likewise suitably secured in an insulated fashion to a ring 149. As with the basic shell 20, the shell 140 and ring 149 have an electrically insulative seam 65′ to insure that they are electrically discontinuous in a circumferential direction. Naturally, only the center portion 150 of the shell 140 is benefited by the seam 65′ since the slits 142 render the portions above and below the coil 90 electrically discontinuous, however, as a practical matter, the seam 65′ is extended completely across the shell 140 in a manner similar to that shown in FIGURE 4.

This arrangement has particular significance where a shell extends an appreciable distance above and/or below an induction coil. In that event, a large area of the shell is directly in the path of the magnetic field passing above and below the ends of the coil. The flux then crosses the shell generally perpendicular to the axis of the coil and appreciable eddy current heating will occur in these portions of the shell unless the metal dimension in a transverse direction is kept below the reference depth. Thus, the portions 144 are preferably no wider than the reference depth to minimize power losses in shell 140. Naturally, slits 142 need only extend in an axial direction to the same extent as does the fringing flux around the coil which for most purposes will not be greater than the radial distance N between the inner diameter of the coil and the outer diameter of the charge.

Referring now to FIGURES 10 and 11, a further modification is illustrated and in this embodiment instead of a nonmagnetic bottom plate 147, portions 144′ of shell 140′ are extended below the ladle and are tapered and turned radially inwardly in supporting engagement with the refractory bottom wall 19. A central disc 132′ is provided to which the radial inner ends of the portions 144′ are bolted in an insulated manner as indicated at 152 in FIGURE 11. This arrangement is similar to that shown in FIGURES 7 and 8 and has similar advantages.

In an induction melting apparatus such as the pouring ladle shown there is usually a conventional metal superstructure which supports the upper portion of the refractory lining. Accordingly, a further aspect of the invention is to reduce the power losses due to the proximity of such a metal casing to an externally mounted induction coil. With this objective, and as mentioned heretofore, the yoke 95 comprises packs 96 of magnetically permeable lamination 98 which are preferably aligned with the high magnetically permeable lamination 82 in the packets 80 imbedded in refractory bottom 19. Thus, the laminations 82 and 98 together provide a low impedance path for the flux which extends from over the upper axial end of the coil 90, behind and radially inwardly below the lower axial end and above the bottom disc 60. Hence, this portion of the flux is confined as closely as possibly inwardly toward the sump 17 and away from the surrounding ladle structure such as housing 125 and disc 60. However, some flux strays or fringes into the immediately adjacent portions of the casing 24 and the bottom disc 60. For this reason magnetic shielding in the form of high conductivity metal rings 102, 104, and 108 are provided. Rings 102 and 108 lie in substantially a common plane above the upper axial end of the coil 90 while ring 104 extends beneath the lower axial end of the coil, each ring having an axial thickness equal to or greater than the reference depth and where the rings are made of brass, this dimension is substantially less than 0.5 inch at 60 cycles per second. The rings 102, 104, and 108 lie directly in the path of the fringing flux extending above and below the axial ends of the coil 90 and partially shield the lower portion of casing 24 and bottom disc 60. Even with this magnetic shielding, however, a portion of the flux reaches the ladle casing 24 and disc 60. For this reason, it is preferable to form the bottom disc 60 of a nonmagnetic, high conductivity metal such as brass so that any induced currents developed therein will cause relatively little power loss; or the bottom may be constructed as shown in FIGURES 5 or 7 to minimize the currents initially capable of being induced therein.

To keep down power losses in the casing 24, it is formed in two sections with the lower section 42 insulated from the upper section 40 and having a nonconductive split 50 therein which extends generally parallel to the axis of the coil 90. Thus the electrically separated section 42 is also electrically discontinuous in a circumferential direction thereby greatly reducing the power loss which would otherwise occur if the casing extended downwardly in uninterrupted fashion.

Having thus described the preferred embodiments of the invention, it will be clear to those having skill in the art that various features may be eliminated, or combined in different fashion as dictated by the particular application to which the invention is applied. For example, with a coreless induction furnace, there may be no need to provide magnetic shielding if there is no metallic furnace superstructure. Hence, obvious changes may be made without departing from the invention as defined in the appended claims.

Having thus described our invention, we claim:

1. In combination with an inductively heated vessel having a refractory lining holding a metal charge, an inductor positioned outside the lining creating a magnetic field for heating the charge and magnetically permeable means positioned outside of the inductor having a portion extending axially beyond one end of the inductor for concentrating the magnetic field inwardly toward the charge, the improvement comprising a reinforcing shell of nonmagnetic metal physically supporting the refractory lining having a cylindrical center portion circumjacent the inductor, an extension of said center portion in continuously supporting relationship with the refractory lining extending axially beyond said one end of the inductor and beyond said magnetically permeable means and a plurality of parallel slits circumferentially spaced in said extension extending from above said one end of the inductor axially beyond said magnetically permeable material whereby the inductive heating effect in said shell is minimized.

2. The improvement according to claim 1 wherein said slits are spaced a distance apart not greater than the reference depth of the magnetic field.

3. The improvement according to claim 2 wherein said slits extend in an axial direction beyond said inductor a distance not less than the radial distance between the inside diameter of the inductor and the outside diameter of the charge.

4. The improvement according to claim 1 wherein the magnetically permeable means extend above and below the upper and lower ends of the inductor and the shell includes extensions above and below the upper and lower ends of the inductor, each said extension having said slits therein extending parallel to the inductor axis from the end of the inductor to beyond the magnetically permeable means.

5. The improvement according to claim 4 wherein said center portion intermediate the extensions includes means rendering it electrically discontinuous in a circumferential direction.

6. The improvement according to claim 4 wherein the portions of said extension between said slits below the lower end of the inductor are longitudinally tapered and extend below the bottom of the refractory lining a substantial distance and are turned radially inwardly in physically supporting relationship to the bottom wall, each tapered portion being rigidly connected at its radial inner end.

7. The improvement according to claim 4 wherein said extension beyond the lower end of the inductor extends to a distance not less than twice the radial distance between the inner diameter of the inductor and the outer diameter of the charge and a metallic support plate is fastened to it in physically supporting relationship to the bottom wall of the refractory lining.

8. The improvement according to claim 4 comprising in addition, nonmagnetic, low resistivity material positioned axially beyond the magnetically permeable means and extending circumferentially over and below the upper and lower ends of the inductor, said material having a thickness equal to or greater than the reference depth of the magnetic field to provide shielding from surrounding structure.

9. The improvement according to claim 4 wherein magnetically permeable material extends from adjacent the lower end of said inductor within the bottom wall of the refractory lining radially inwardly below said metal charge.

10. The improvement according to claim 9 wherein a nonmagnetic plate of low resistivity metal is in physically supporting relationship to the bottom wall of the refractory lining and said magnetically permeable material is supported by, but electrically insulated from, said plate.

11. The improvement according to claim 1 wherein the maximum radial cross sectional dimension of said shell is not greater than the reference depth of the magnetic field.

References Cited

UNITED STATES PATENTS

| 3,162,710 | 12/1964 | Anderson | 13—27 |
| 3,177,282 | 4/1965 | Kasper et al. | 13—27 |
| 3,223,519 | 12/1965 | Schipperit | 13—27 X |

RICHARD M. WOOD, *Primary Examiner.*

L. H. BENDER, *Assistant Examiner.*